United States Patent Office 3,508,422
Patented Apr. 28, 1970

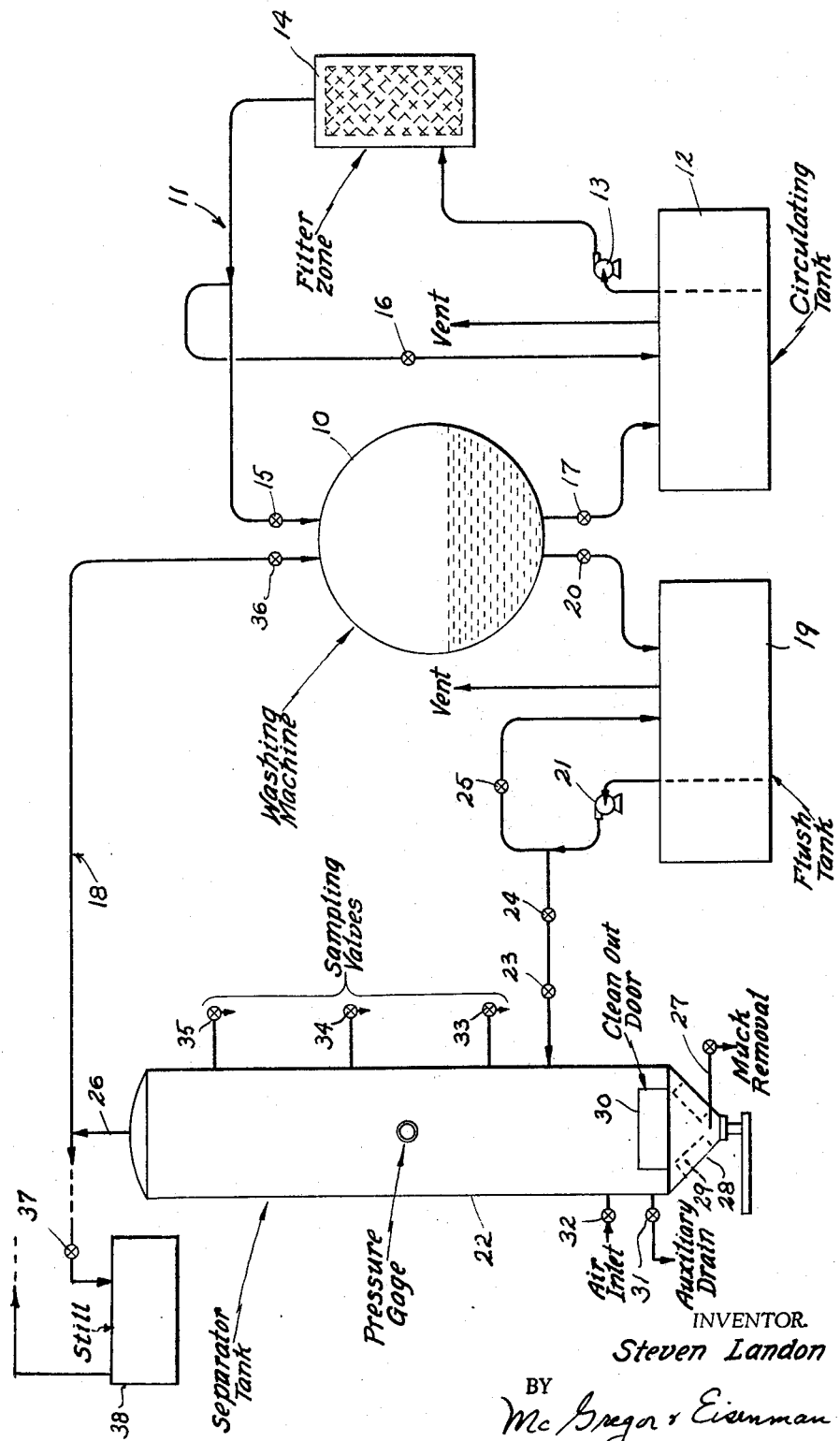

3,508,422
RECIRCULATING DRY CLEANING SYSTEM
Steven Landon, Bayside, N.Y., assignor to Washex Machinery Corporation, Plainview, N.Y., a corporation of New York
Continuation of application Ser. No. 689,400, Dec. 11, 1967. This application June 9, 1969, Ser. No. 835,881
Int. Cl. D06f 29/00; B08b 3/04
U.S. Cl. 68—18
6 Claims

ABSTRACT OF THE DISCLOSURE

An industrial cleaning system using solvents including a washing machine having two solvent recirculating loops, one passing through a filter and a circulating tank, and the other passing through a flush tank and a vertically arranged separating tank maintained under pressure, with the input pressure at the bottom and output flow at the top arranged to establish a relatively low upward velocity such that a counterflow of soil solids occurs so that the effluent at the top is relatively free of dispersed soil particles. The effluent can be selectively passed either back to the washing machine or to the further purifying stage.

---

This application is a continuation of Ser. No. 689,400, filed Dec. 11, 1967, and now abandoned.

This invention relates to cleaning systems of the type using recirculated cleaning solvents. In particular the invention is concerned with industrial type cleaning plants capable of handling a wide range of soiled work and having multiple solvent circuits which include a coordinated series of solvent purifying devices.

A major problem in cleaning heavily soiled industrial work is the removal of large quantities of insoluble soil and contaminants from the solvent. For example, work such as overalls, shop towels, floor mats, mops, fender covers, and the like contain up to ten times the amount of insoluble soil held by ordinary work, such as suits, dresses and household items. By weight, the insoluble soil content of industrial work ranges from 1% to 3% of the bone dry weight (exclusive of moisture and soluble soil), while ordinary household work contains a fraction of 1%. Such high concentrations of soil exceed conventional filter capacity and leads to excessive filter pressure build-up, often beginning with the first load, followed by premature shut-down for filter services or replacement. Also, muck accumulates in the solvent tanks requiring frequent, costly and messy clean-out chores. Pumps which handle highly contaminated solvents require frequent repairs and replacement.

Many attempts have been made to deal with the problem of high solvent contamination by insoluble matter, including caustic clarification, centrifuging and distillation. Of these, distillation in on-site stills has in general been the most successful, even though by their nature stills are primarily designed to remove solvent-soluble contaminants as opposed to copius quantities of insoluble soil. Furthermore stills of practicable cost and size have distillation capacities which fall many gallons short of the continuous requirements for large volume cleaning operations. Also, the capacity of any given still decreases rapidly as encrustations form on the heat exchanging surfaces. Costly shut-downs are required during which the still must be boiled down and scraped clean.

Accordingly, it is an object of the present invention to provide an improved industrial cleaning system in which the still is protected from large accumulations of soil and in which, as a part of a continuous process, relatively large amounts of insoluble soil can be removed from cycling solvents without resort to chemicals or heat.

Still another object of the invention is to provide an industrial cleaning system in which the used solvents which normally flow to the still and/or the cleaning machine are preliminarily purged of large amounts of insoluble solids as part of an in-line process.

In accordance with the present invention an industrial cleaning system is provided in which there are at least two solvent-recirculating loops or circuits. The first includes a circulating tank and a mechanical filter such as a diatomaceous earth filter and is adapted to be operated continuously during a cleaning cycle. The second solvent circuit includes a dump or flush tank, a separating tank and a still, with provisions to cycle dirty solvent through the separating tank and selectively, back to the cleaning machine or to the still and then back to the machine. The separating tank takes the form of a vertically oriented tank having an inlet spaced upwardly from its bottom and normally completely filled with solvent under pressure from a pump drawing from the flush tank. The outlet is at the top of the tank and dimensions are so selected that a low upward velocity, which is not in excess of approximately one foot per minute, occurs counter to the gravity flow downward of insoluble soil. With the velocity controlled and the length of the separating tank appropriately selected, solvent reaching the top is relatively free of dispersed soil particles to the extent that the solvent can be returned directly to the washing machine in condition suitable for performing an initial batch cycle. Meantime the still is operating to generate completely purified solvent suitable for use in the final cleaning cycle or replenishing the circulating solvent circuit.

A bypass return from the flush tank pump to the flush tank maintains a continual circulation of soiled solvent which prevents muck build-up within that tank. The soil or muck which accumulates in the separator tank at the bottom is periodically removed by means of automatic scrapers and muck dump valves.

The above and other features and objects of the invention will be apparent having reference to the following specification taken in conjunction with the accompanying drawing in which there is illustrated schematically a typical industrial cleaning plant installation.

Referring to the drawing there is illustrated an industrial cleaning installation including a washing or cleaning machine 10 having a first solvent loop or circuit 11 which includes a circulating tank 12 having a capacity sufficient to carry at least one charge of cleaning solvent. Solvent is drawn from the tank 12 by a pump 13 and passed through a filter 14, the output of which can be passed directly into the machine 10 via a valve and conduit circuit 15 or bypassed back to the circulating tank by a bypass valve and conduit circuit 16. A valve and conduit circuit 17 controls the flow of solvent from the machine 10 back to the circulating tank. The valves 15, 16 and 17 are in the control of the master programming system (not shown) for the installation.

A second solvent loop or circuit 18 includes a dump or flush tank 19 connected to the machine 10 through a valve and conduit circuit 20. The solvent is withdrawn from the flush tank 19 by a pump 21, which discharges either into a vertically oriented separator tank 22 through a conduit and valve circuit 23, 24 or into a by-pass circuit 25 including a conduit and valve which discharges back into the flush tank. The valve and conduit circuit 23, 24 discharges into the separator tank 22 at a point spaced upwardly from the lower end.

The separator tank 22 includes an outlet conduit 26 at its upper end for relatively clean solvent and a discharge conduit 27 for muck removal at the bottom. The bottom of the separator tank 22 is preferably in the form of an inverted cone 28, within which are mounted rotary scrapers 29. A clean-out door 30, an auxiliary conduit and drain valve 31, and an air inlet conduit and valve 32 are also fitted in the vicinity of the bottom of the tank. Sampling valves or other measuring and indicating devices 33, 34 and 35 are also provided along the length of the tank between the inlet conduit 23 and the outlet conduit 26. The flow from the outlet conduit 26 can be channeled by a conduit and valve 36 to the machine 10 or it can be passed via a valve and conduit 37 to the still 38. The output of purified solvent from the still can be led directly back to a solvent storage tank (not shown), or into the circulating tank 12, or into the flush tank 19.

In operation, the initial batch of dirty solvent is dumped from the machine 10 into the flush tank 19, from which it is pumped by the pump 21 into the separator tank 22 which is thereby kept filled with solvent and under pressure at all times. Solvent is drawn from the top of the separator tank only when the machine 10 calls for a fresh batch or when the still 38 calls for solvent. At all times, when solvent is not flowing from the separator tank by means of its outlet conduit 26, the bypass valve 25, which can be pressure-responsive, opens to form a continuing flow loop which tends to prevent the accumulation of muck in the flush tank. Solvent flows into the separator tank 22 from the flush tank 19 intermittently and at very low upward velocities on the order of not more than approximately one foot per minute. The heavy insoluble matter in the solvent, therefore, tends to set up a counterflow downward under the influence of gravity into the cone section 28, from which it is removed periodically, say, daily, by actuating the scrapers 29 and the muck-removal conduit and valve 27. The solvent reaching the top outlet contains only a minimal quantity of finely dispersed soil particles and can be used for the following initial batch run (first cleaning stage) of the washing machine or fed to the still for complete purification.

In a typical system formed in accordance with the invention, a separator tank having a capacity of between three and four times the volume of one batch of solvent is provided with the inlet conduit 23 disposed approximately 25% of the distance from the bottom. The maximum flow rate into the separator tank from the flush tank 19 was gallons per minute. The maximum upward flow rate of solvent in the separator tank was approximately one foot per minute. The system reduced the distillation requirements from 50 to 60 gallons of solvent per 100 pounds of work cleaned in a conventional system, to 15 to 20 gallons per 100 pounds of work cleaned. From one-third to two-thirds of the solid, insoluble soil was removed from the solvent before it was passed to the still. While the system is operative with both synthetic and petroleum solvents, it is in general preferred that the petroleum solvents, which tend to be lighter, be used because of the increased separating action.

While the invention has been described above having reference to a preferred embodiment, it will be understood that it can take various other forms and arrangements and should not be limited except as set forth in the accompanying claims.

I claim:
1. In a dry cleaning system having a batch type cleaning machine and using cleaning solvents, a first solvent circulating loop connected to the cleaning machine and including pump means to establish solvent flow into the machine prior to and during washing cycles, a second solvent circulating loop connected to the cleaning machine comprising drain means, second pump means, and a vertically oriented separating tank having an input adjacent its lower end and output adjacent its upper end, means to direct the output from the separator to the machine, and control means including said second pump means to establish an upward flow rate within the separating tank from the inlet to the outlet to establish a gravity counterflow downward of solid soil particles.

2. Apparatus as set forth in claim 1 including an evaporating still and means to selectively connect the output of the separating tank to the evaporating still.

3. Apparatus as set forth in claim 1, said second pump means being disposed between the drain means and the separating tank, and valve means to selectively direct the output of the pump means back to the drain means in a recirculating cycle or into the separating tank.

4. Apparatus as set forth in claim 3, said inlet to the separating tank being disposed upwardly of its lower end to establish a sludge space in the lower end of the tank, and means to remove sludge therefrom.

5. Apparatus as set forth in claim 3, the upward flow of solvent in the separating tank being approximately one foot per minute, and the volume of the separating tank being approximately three to four times the batch solvent requirement of the cleaning machine.

6. Apparatus as set forth in claim 1, including a circulating tank, said first circulating loop including filter means and pump means between the filter means and the circulating tank to pump solvent through the filter, the filter means having an output connected to the cleaning machine, and selective bypass means to discharge the output of solvent from the filter means into the circulating tank.

References Cited

UNITED STATES PATENTS

| | | | |
|---|---|---|---|
| 1,637,902 | 8/1927 | Holland | 68—18 |
| 2,895,321 | 7/1959 | Mayberry et al. | 68—18 XR |

ROBERT L. BLEUTGE, Primary Examiner

U.S. Cl. X.R.

134—209; 210—167, 513